United States Patent [19]

Gionfriddo

[11] Patent Number: 4,689,280
[45] Date of Patent: Aug. 25, 1987

[54] FUEL CELL STACK END PLATE STRUCTURE

[75] Inventor: Salvatore Gionfriddo, New Britain, Conn.

[73] Assignee: Energy Research Corporation, Danbury, Conn.

[21] Appl. No.: 831,999

[22] Filed: Feb. 20, 1986

[51] Int. Cl.4 .......................................... H01M 8/02
[52] U.S. Cl. ........................................ 429/34; 429/39
[58] Field of Search ................. 429/34, 35, 36, 37, 429/38, 39

[56] References Cited

U.S. PATENT DOCUMENTS 3,615,852 10/1971 Gehring ............................. 429/38
4,514,475 4/1985 Mientek ............................. 429/37
4,604,331 8/1986 Louis ................................. 429/37

*Primary Examiner*—Donald L. Walton
*Attorney, Agent, or Firm*—John J. Torrente

[57] ABSTRACT

End plate structure for a fuel cell stack including a first plate and a second plate of lesser thickness and having a first region and second and third regions at transverse opposite ends of the first region, the second and third regions each having a first portion extending outwardly of the plane of the first region and a second portion extending toward the central portion of the first region, the first plate being supported on the second portions of the second and third regions to define a channel in which is disposed a resilient means.

11 Claims, 2 Drawing Figures

FUEL CELL STACK END PLATE STRUCTURE

BACKGROUND OF THE INVENTION

This invention relates to fuel cell stacks and more particularly to the plate structure used at the ends of such stacks.

It is conventional in fuel cell design to arrange individual fuel cells one on top of the other and to compress this stack of cells between two terminal or end plates. In addition to the compressive forces provided to the stack by the end plates, these plates also provide the stack with access to the external circuit containing the load as well as provide the spacing needed to seal reactant gases from the atmosphere.

Previously, particularly in molten carbonate fuel cell stacks, the cells immediately adjacent the end plates experience a performance loss, associated with an increase in cell internal resistance. Poor compliance of the components of these end cells is believed to be the primary reason for this higher internal resistance and attendant lower performance. This poor compliance, in turn, is believed to be attributable to the rigid nature of the stack end plates which are far less tolerant to cell component thickness variations than are the sheet-metal bipolar plates used between intermediate cells in the stack.

It is therefore a primary object of the present invention to provide plate structure for the end plates of a fuel cell stack which does not suffer from the above disadvantages.

It is a further object of the present invention to provide plate structure for the end plates of a fuel cell stack which inhibits increases in the internal resistance exhibited by the adjacent end cells of the stack.

It is another object of the present invention to provide plate structure for the end plates of a fuel cell stack which results in better compliance of the components of the end cells of the stack.

It is yet a further object of the present invention to provide plate structure for the end plates of a fuel cell stack which exhibits greater resiliency than heretofore constructed plates.

SUMMARY OF THE INVENTION

In accordance with the principles of the present invention, the above and other objectives are realized in a plate structure comprising a first plate and a second plate having a thickness less than the thickness of the first plate. At opposite transverse ends of a first region of the second plate second and third regions are provided each of which having first and second portions. Each first portion of these regions extends out of the plane of the first region and each second portion follows from its corresponding first portion and extends toward the central area of the first region.

The first plate is situated in adjacent, abutting relationship to these second portions so that a channel is defined between the first plate and the first region of the second plate. The formed channel receives a resilient means which is disposed in contacting relationship with the first plate and the second region. The outer peripheral areas of the first plate are further welded to the abutting outer peripheral areas of the second portions of the second and third regions.

In the plate structure to be disclosed hereinafter, the first plate is flat and situated horizontally as is the first region and the second portions of the second and third regions of the second plate. The first portions of the second and third regions are, in turn, also flat but situated vertically upwardly. In this form of the invention, the resilient means comprises a corrugated third plate and a fourth flat plate situated between the first plate and the crests of the corrugations of the third plate and in spaced horizontal alignment with the second portions of the second and third regions of the second plate. The corrugated plate extends to the first portions of the second and third regions and its corrugations are spaced in this direction and extend in the transverse direction.

The corrugated plate has a thickness less than that of the second plate, while the thickness of the fourth plate is equal to that of the second plate. The latter plate is also provided at each of its other opposite ends with third and fourth regions each having a first portion extending vertically downwardly and a following second portion extending horizontally toward the central portion of the first region. The second plate thus has the form of a conventional bipolar plate.

With this plate structure for the invention, the overall plate structure exhibits greater resiliency, thereby allowing greater compliance to the adjacent fuel cells. These cells thus exhibit a greater compliancy and an internal resistance which tends to remain constant.

BRIEF DESCRIPTION OF THE DRAWINGS

The above and other features of the present invention will become more apparent upon reading the following detailed description in conjunction with the accompanying drawings, in which.

DETAILED DESCRIPTION

Figure 1:
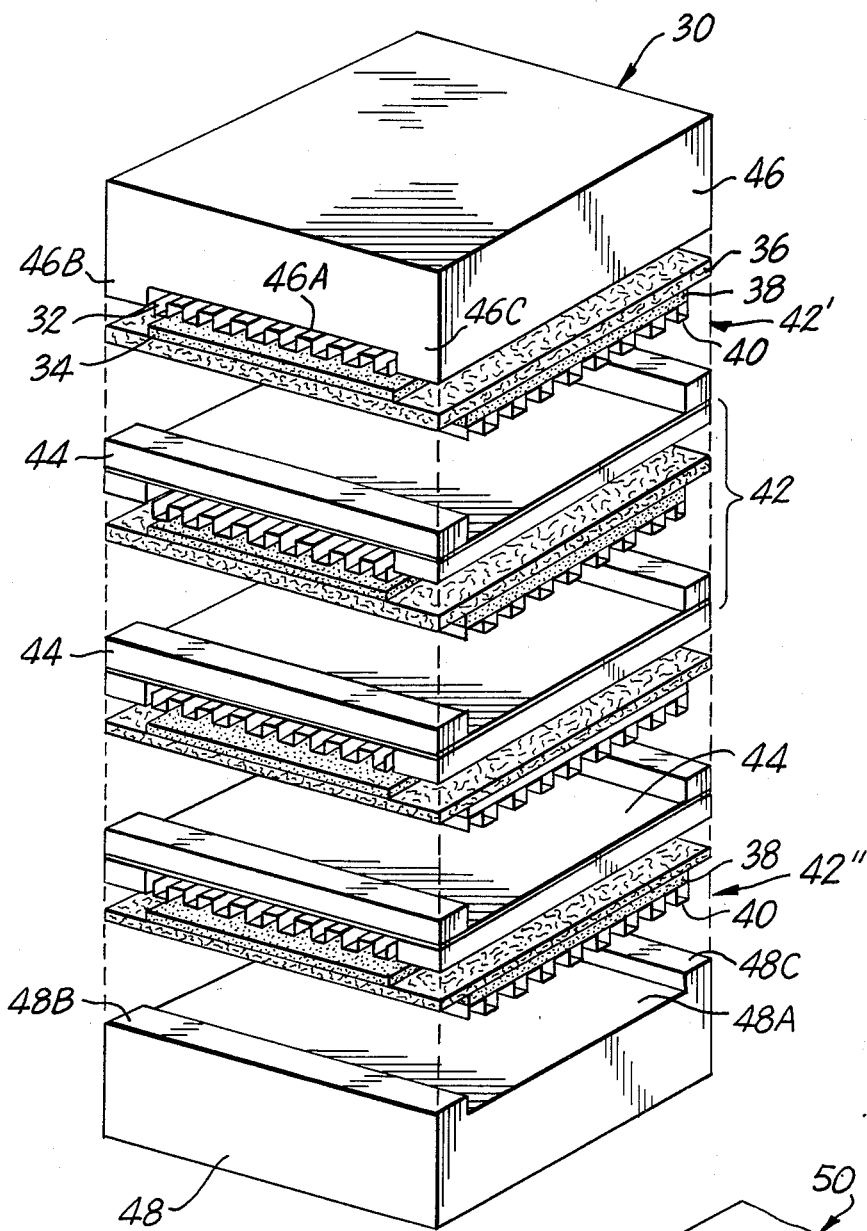
FIG. 1 illustrates schematically a fuel cell stack employing prior end plate structure.

In FIG. 1, fuel cell stack 30 comprises a plurality of like fuel cell assembly 42. Each fuel cell assembly 42 is assumed to be molten carbonate assembly and comprises upper and lower bipolar plates 44 which together sandwich an anode electrode 34, an electrolyte matrix 36 and a cathode electrode 38. The electrodes 34 and 38 abut corrugated plates 32 and 40, respectively. The channels defined by the corrugations in the plates 32 and 40 act as passageways for distributing fuel and oxidant process gas to the electrodes 34 and 38.

End plates 46 and 48 of substantially greater thickness than the bipolar plates 44 are provided at the upper and lower ends of the stack 30 for compressing the cell assemblies 42 of the stack together. The end plate 6 has a central cutout portion 46A which accommodates the corrugated plate 32 and its adjacent anode electrode 34 of the uppermost fuel cell assembly 42'. Likewise, the end plate 48 has a similar cutout 48A which accommodates corrugated plate 40 and the cathode electrode 38 of the lowermost fuel cell assembly 42''. Transversely spaced peripheral areas 46B, 46C and 48B, 48C of the plates 46 and 48, in turn, abut peripheral portions of the matrices 36 of the assemblies 42' and 42'', respectively.

As mentioned previously, the end plates 46 and 48 compress the fuel cell assemblies 42 together to form a unified stack 30. However, during operation of the stack it is found that the plates 46 and 48, being significantly thicker than the bipolar plates 44, are much too rigid to compensate for the reduction in thickness, i.e., creep or shrinkage, of the compensate, i.e., the anode 34, matrix 36 and cathode 38, of the assemblies 42′ and 42″. As a result, the degree of contact between the components of these assemblies is lessened and the internal resistance of the assemblies increased. Eventually this increase in internal resistance results in cell failure.

In accordance with the principles of the present invention, plate structure 50 for the end plates 46 and 48 is provided which can better accommodate for any shrinkage in the components of the end cells 42′ and 42″. As a result, the internal resistance of these cells does not increase significantly and cell failure is avoided.

Figure 2:
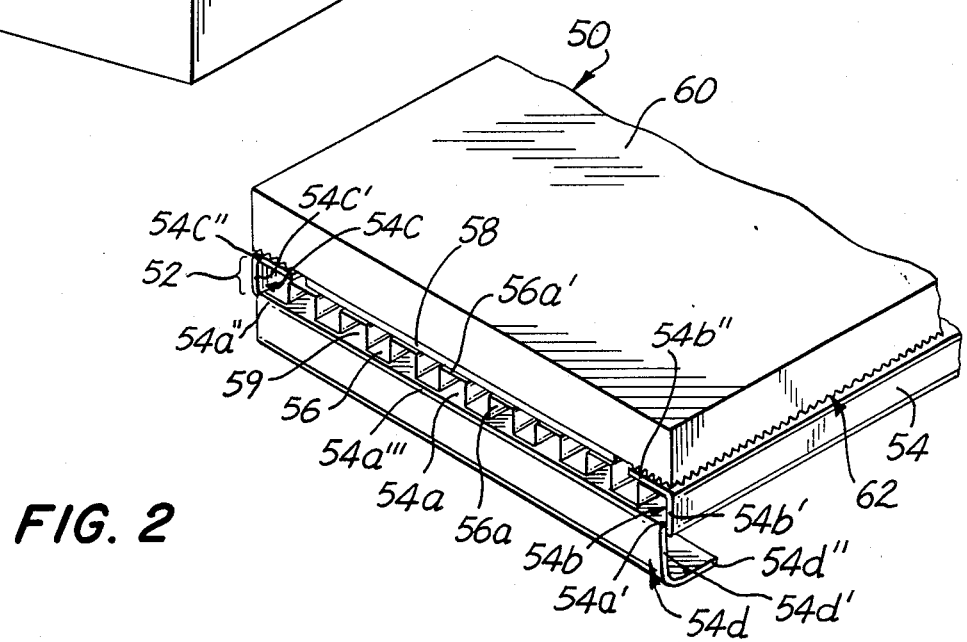
FIG. 2 shows an end plate structure usable in the fuel cell of FIG. 1 and configured in accordance with the principles of the present invention.

FIG. 2 illustrates plate structure 50 in accordance with the invention. The structure 50 comprises a thick top plate 60 and a thinner bottom plate 54. The bottom plate 54 has a first, horizontally disposed, flat central region 54a and, at opposite transverse ends 54a′ and 54a″ of this first region, second and third regions 54b and 54c of like configuration. Each of the regions 54b and 54c has a vertically upwardly extending flat portion 54b′, 54c′ and following this portion a flat horizontal portion 54b″ and 54c″ extending toward the central area of the flat region 54a. The regions 54b and 54c thus form with the transverse ends of the central region 54a U-shaped passages.

The plate 60 is supported on the horizontal portions 54b″ and 54c″ of the regions 54b and 54c and defines therewith and with central region 54a a channel 59. Situated within the channel 59 and supported on the central region 54a is a corrugated plate 56. The plate 56 extends to the opposite transverse ends 54a′ and 54a″ of the region 54a and it also extends to the other opposite ends 54‴ and 54a″″ (not shown) of this region.

As shown, the corrugations 56a of the plate 56 are spaced in the direction connecting the plate ends 54a′ and 54a″ and extend in the direction connecting the plate ends 54a‴ and 54a″″. The height of the corrugations, moreover, is equal to the height of the vertical portions 54b′, 54c′ of the plate 54 so as to fit within the U-shaped channels at the ends 54a′ and 54a″ of the region 54a. As a result, a space equal to the thickness of plate 54 is formed between the crest regions 56a′ of the plate 56 and the plate 60.

A further horizontally disposed, flat plate 58 is situated in this space and contacts the crest 56a′ and the plate 60. The plate 58 extends to the ends 54a‴ and 54a″″ of the region 54a and in the direction transverse thereto terminates short of the plate portions 54b″ and 54c″.

Welds 62 at the vertical surfaces of the peripheral edges of the plate 60 and the abutting vertical surfaces of the peripheral edges of portions 54b″ and 54c″ connect the plate 60 to the plate 54. The plate 54 is further provided with additional regions 54d and 54e (not shown) at its ends 54a‴ and 54a″″. Each of these regions includes a flat vertically downwardly extending portion 54d′ and 54e′ and a flat horizontal portion 54d″ and 54e″ extending toward the center of the region 54a. The regions 54d and 54e thus each form an L-shaped member.

The plate 54 of the plate structure 50 thus has the overall form of an inverted bipolar plate, and, in combination with the corrugated plate 56 and the flat plate 58, simulates a dummy cell 52. The latter two components, i.e., plates 56 and 58, affords resiliency to the dummy cell and to the overall end cell structure formed by the dummy cell and plate 60.

In use, the end cell structure is disposed so that the portions 54d″ and 54e″ are situated in the positions of the respective peripheral areas 46A, 46B and 48A, 48B of the end plates 46 and 48, respectively. With the end structures 50 in place, changes in the thicknesses of the adjacent end cell components are now compensated for by the above-mentioned resiliency of the end structure. Contact is thus maintained and internal resistance of the end cells assured during operation of the fuel cell stack.

In a typical design, the plate 60 may comprise stainless steel and have a thickness of $\frac{3}{4}$ to $1\frac{1}{2}$ inches. The bipolar plate 54 may be made form stainless steel nickel cladded and the plate 58 from stainless steel or nickel plate. The thickness of the plates 54 and 58 may be about 0.015 of an inch. Finally, the plate 56 may be formed from Iconel or stainless steel and have a thickness of about 0.008 to 0.010 of an inch.

In all cases, it is understood that the above-described arrangements are merely illustrative of the many possible specific embodiments which represent applications of the present invention. Numerous and varied other arrangements can readily be devised without departing from the spirit and scope of the invention.

What is claimed is:

1. A plate structure for use as the end plate in a stack of fuel cells, the plate structure comprising:
   a first plate;
   a second plate of lesser thickness than said first plate, said second plate having a first region and second and third regions extending from opposite first and second ends of said first region, each of said second and third regions having a first portion extending outwardly in a first sense of the plane of said first region and a following second portion extending toward the central portion of said first region;
   said first plate abutting and being supported on said second portions of said second and third regions, thereby defining a channel opening at third and fourth ends of said first region, said third and fourth ends of said first region being transverse to said first and second ends of said first region;
   and resilient means disposed in said channel.

2. Plate structure in accordance with claim 1, further comprising:
   a first weld area welding the peripheral edges of said second section of said second region to the abutting peripheral edges of said first plate
   a second weld area welding the peripheral edges of said second portion of said third region to the abutting peripheral edges of said first plate.

3. Plate structure in accordance with claim 2, wherein:
   said second plate further comprises fourth and fifth regions extending from said third and fourth ends of said first region, each of said fourth and fifth regions having a first portion extending outwardly in a second sense of the plane of said first region and a following second portion extending toward the central portion of said first region.

4. Plate structure in accordance with claim 3 wherein:
   said first plate is flat;
   the first, second, third, fourth and fifth regions of said second plate is flat;
   said first region and said second portion of said second, third, fourth and fifth regions are horizontally disposed;

said first portions of said second and third regions are upwardly vertically disposed;

and said first portions of said fourth and fifth regions are downwardly vertically disposed.

5. Plate structure in accordance with claim 4 wherein:

said resilient means comprises:

a third plate of lesser thickness than said second plate, said third plate having corrugations spaced in a direction extending between said first and second ends of said first region, said corrugations extending between said third and fourth ends of said first region;

and a fourth plate situated between and in contact with the crest regions of said corrugations and said first plate.

6. Plate structure in accordance with claim 5 wherein:

said fourth plate is flat and horizontally disposed.

7. Plate structure in accordance with claim 6 wherein:

the thickness of said fourth plate is equal to the thickness of said second plate.

8. Plate structure in accordance with claim 6 wherein:

said fourth plate extends in the direction of said first and second ends of said first region to a point short of said second portion of said second and third regions.

9. Plate structure in accordance with claim 1 wherein:

said resilient means comprises:

a third plate of lesser thickness than said second plate, said third plate having corrugations spaced in a direction extending between said first and second ends of said first region, said corrugations extending between said third and fourth ends of said first region;

and a fourth plate situated between and in contact with the crest regions of said corrugations and said first plate.

10. Plate structure in accordance with claim 9 wherein:

said fourth plate is flat and horizontally disposed.

11. Plate structure in accordance with claim 10 wherein:

said fourth plate extends in the direction of said first and second ends of said first region to a point short of said second portions of said second and third regions.

* * * * *